United States Patent
Leadley

(10) Patent No.: US 7,469,717 B2
(45) Date of Patent: Dec. 30, 2008

(54) FAIL SAFE SHUTTER FOR USE WITH A CROSS-STACK MONITOR

(75) Inventor: David E. Leadley, Sheffield (GB)

(73) Assignee: Land Instruments International Ltd. (GB)

( * ) Notice: Subject to any disclaimer, the term of this patent is extended or adjusted under 35 U.S.C. 154(b) by 180 days.

(21) Appl. No.: 11/459,089

(22) Filed: Jul. 21, 2006

(65) Prior Publication Data

US 2007/0069171 A1    Mar. 29, 2007

(30) Foreign Application Priority Data

Sep. 23, 2005   (GB) ................................. 0519430.3

(51) Int. Cl.
*F16K 31/04* (2006.01)
(52) U.S. Cl. .................... 137/559; 251/69; 251/129.12; 251/328
(58) Field of Classification Search ................................
251/129.11–129.13, 326, 328, 900, 67, 69; 137/559
See application file for complete search history.

(56) References Cited

U.S. PATENT DOCUMENTS

| | | | | | |
|---|---|---|---|---|---|
| 828,547 | A | * | 8/1906 | Hayden ................. | 251/129.12 |
| 863,180 | A | * | 8/1907 | Howard ........................ | 251/76 |
| 916,831 | A | * | 3/1909 | Bettinger ................ | 251/129.12 |
| 2,315,389 | A | * | 3/1943 | Benson et al. .......... | 251/129.12 |
| 2,738,033 | A | * | 3/1956 | Towle et al. .............. | 185/40 R |
| 2,761,331 | A | * | 9/1956 | Buescher ................ | 251/129.12 |
| 3,258,985 | A | * | 7/1966 | Jordan ..................... | 251/129.12 |
| 3,685,790 | A | * | 8/1972 | Crowe .......................... | 251/67 |
| 4,621,789 | A | * | 11/1986 | Fukamachi ............. | 251/129.12 |
| 4,749,168 | A | * | 6/1988 | Maxwell et al. .............. | 251/328 |
| 4,759,529 | A | * | 7/1988 | Berger et al. ................. | 251/328 |
| 4,783,048 | A | * | 11/1988 | St. Clair ....................... | 251/326 |
| 4,920,811 | A | * | 5/1990 | Hopper ......................... | 251/69 |
| 5,234,196 | A | * | 8/1993 | Harris .......................... | 251/328 |
| 6,471,182 | B1 | * | 10/2002 | McIntosh ................ | 251/129.12 |

* cited by examiner

*Primary Examiner*—John Bastianelli
(74) *Attorney, Agent, or Firm*—Trexler, Bushnell, Giangiorgi, Blackstone & Marr, Ltd.

(57) ABSTRACT

A fail-safe shutter (13) for a "cross-stack" monitor, comprises a body member (14) having an aperture (1) through which, in use, an associated monitoring instrument is adapted to sight. A gate (3) is movable between a retracted, open position in which the aperture (1) is exposed, and a closed position in which the aperture (1) is closed-off by a portion of the gate (3), and means are provided to bias the gate (3) towards its closed position. An electric motor (20), a gearbox (19) and a magnetic clutch (16) are provided, the clutch (16), when energised, connecting the gate (3) to the motor (20) via the gearbox (19), and the motor (20), when energised, serving to drive the gate (3) via the gearbox (19) and the energised clutch (16) to an open position, with attainment of the latter de-energising the motor (20) only, and with the bias means (7) being insufficient to overcome the mechanical advantage of the gearbox (19), whereby the gate (3) is retained in its open position until such time as the clutch (16) is de-energised. Control circuitry (21) is provided to maintain and/or interrupt and/or return electrical supply to the clutch, and/or to the electric motor.

6 Claims, 5 Drawing Sheets

FAIL SAFE SHUTTER FOR USE WITH A CROSS-STACK MONITOR

This application claims the benefit of British application Serial No. 0519430.3 filed Sep. 23, 2005

FIELD OF THE INVENTION

This invention relates to a fail-safe shutter for a cross-stack monitor, and to a monitor provided with such a shutter.

BACKGROUND OF THE INVENTION

Various cross-stack monitors are used for industrial pollution monitoring or combustion control—for example opacity monitors measuring dust or CO monitors measuring CO.

These are optical instruments. A beam of light is transmitted across the stack and analysed. Sometimes the source is at one side of the stack and the receiver (analyser) at the other side. Sometimes source and receiver are put together on one side of the stack and a reflector is placed on the other side.

It is important to protect the instrument from stack gases—which may be hot, dirty and corrosive. This cannot be achieved simply by use of windows, since these get dirty and this influences calibration. It is typically achieved by windows in combination with air-purged sight tubes.

In a typical arrangement sight tubes are welded to the stack and clean air is fed to them from electrically powered blowers. As long as this airflow is maintained, stack gas does not penetrate into the sight tubes. Typically the sight tubes end in flanges. The two sides of the monitoring instrument are bolted to these flanges. Each side of the instrument has a closure window. These windows stay clean because stack gas does not reach them.

It is good practice to interpose a 'fail-safe shutter' between the flange and the instrument at both sides. The purpose of this shutter is to close off the end of the sight tube if the purge air supply should fail for any reason.

Various designs of shutter are commercially available. A good design achieves the following:
  Positive closure when the purge air flow stops.
  Positive closure when the electrical power supply fails (this being a primary reason for loss of purge air—the blowers stop).
  A good seal against the stack gas when closed
  Seal protection of the fail-safe shutter mechanism as well as the monitoring instrument
  Automatic re-opening when the purge air flow resumes
  High reliability
  Small size—in particular along the direction of the sight path It is surprisingly difficult to achieve all the above in practice.

Some known designs are based on the purge flow itself holding a flap open against a spring. This arrangement may be elegant but does not always perform well in practice. Purge air is typically sourced from blowers rather than a compressed air supply. Available pressure is thus very limited, allowing only a weak spring force at the flap. This can lead to unreliable closure, poor sealing, and a tendency to 'stick' either open, closed or half open.

Other known designs use a solenoid to hold a gate open against a drop-weight. A flow sensor detects a loss of purge air, de-energising the solenoid and allowing closure. The same happens if the electrical power fails. Such designs can work well but require manual re-setting. This involves someone climbing the stack to lift the gate against the drop weight.

Similar known designs use a solenoid to hold a flap open against a spring. They suffer the same problems.

Other known designs use a motorised ball-valve in conjunction with a sensor which detects purge airflow. These can be effective but tend to be large and very expensive. In part this is due to the size of ball valve required to pass the required optical beam, in part to the need for a back-up power supply to allow the valve to be driven closed if the main electrical supply fails.

Similar designs use a motorised gate valve. They suffer the same problems.

Summary of a First Aspect of the Invention

According to a first aspect of the present invention there is provided, a fail-safe shutter for a "cross-stack" monitor, comprising
  (i) a body member having an aperture through which, in use, an associated monitoring instrument is adapted to sight;
  (ii) a gate movable between a retracted, open position in which the aperture is exposed, and a closed position in which the aperture is closed-off by a portion of the gate;
  (iii) means to bias the gate towards its closed position; characterised in that the shutter further comprises
  (iv) an electric motor, a gearbox and a magnetic clutch, the clutch, when energised, connecting the gate to the motor) via the gearbox, and the motor, when energised, serving to drive the gate via the gearbox and the energised clutch to an open position, with attainment of the latter de-energising the motor only, and with the bias means being insufficient to overcome the mechanical advantage of the gearbox, whereby the gate is retained in its open position until such time as the clutch is de-energised either by a power failure, or by purge gas sensing means detecting absence of purge gas, or by other means; and
  (v) control circuitry to maintain, and/or interrupt and/or return electrical supply to the clutch, and/or to the electric motor.

Summary of a Second Aspect of the Invention

According to a second aspect of the invention, there is provided a cross-stack monitor incorporating a fail-safe shutter in accordance with the first aspect.

ADVANTAGES OF THE INVENTION

The shutter and monitor in accordance with the invention meet the 'good design' criteria listed above.

Preferred or optional features of the Invention

The gate is biased to its closed position by one or more coil return springs.

The gate is provided with a rack in mesh with a pinion, the pinion being connected to the magnetic clutch (16)

The rack has teeth along an edge or surface, e.g. an upper or lower edge.

The rack is linearly slidable between closed and open positions.

The body member is provided with a plurality of roller guides adapted to engage lower and upper edges of the gate.

A roller opposes the pinion, to maintain the pinion in engagement with the rack.

One face of the magnetic clutch is permanently fixed to the pinion.

A purge air flow sensor is connected to the control means.

A leading end of the gate has a bevelled end.

The body member has a sloping end stop for engagement by the bevelled end of the gate in the closed position of the gate.

A resilient gasket e.g. of synthetic rubber surrounds the aperture and is sealingly engageable by the gate in its closed position.

The seal is provided at what, in use, is the stack side of the shutter, whereby in the closed position of the gate, components of the shutter i.e. its operating mechanism is/are protected from stack gas.

The control circuitry incorporates means including a trip switch to cut power to the electric motor when the gate has attained its fully open position.

The shutter of the invention is reliable—some reasons are:
  In the open position of the gate, the magnetic clutch is energised (engaged) but the motor power is cut—ie there are no moving parts in this condition.
  Once the clutch releases, closure is effected simply by one or more coil return springs.
  The clutch is switched by a simple circuit responding to a conventional (purge gas) flow sensor in a sight tube air feed line.
  If the electrical supply fails the clutch inevitably de-energises and releases.
  The motor power is cut in the open position of the gate by a simple micro-switch.
  The gate is guided by a number of PTFE rollers and moves freely with large clearance (the seal is achieved through the forward motion against the gasket).
  Its working life is many thousands of operations. This, together with the avoidance of operator intervention, allows a daily test cycle to be programmed as part of routine operation.
  The design is 'flat'—i.e. its dimension along the instrument sighting axis is only about 1 inch, this for an aperture diameter of 2 to 3 inches.

DETAILED DESCRIPTION OF DRAWINGS

Figure 1:
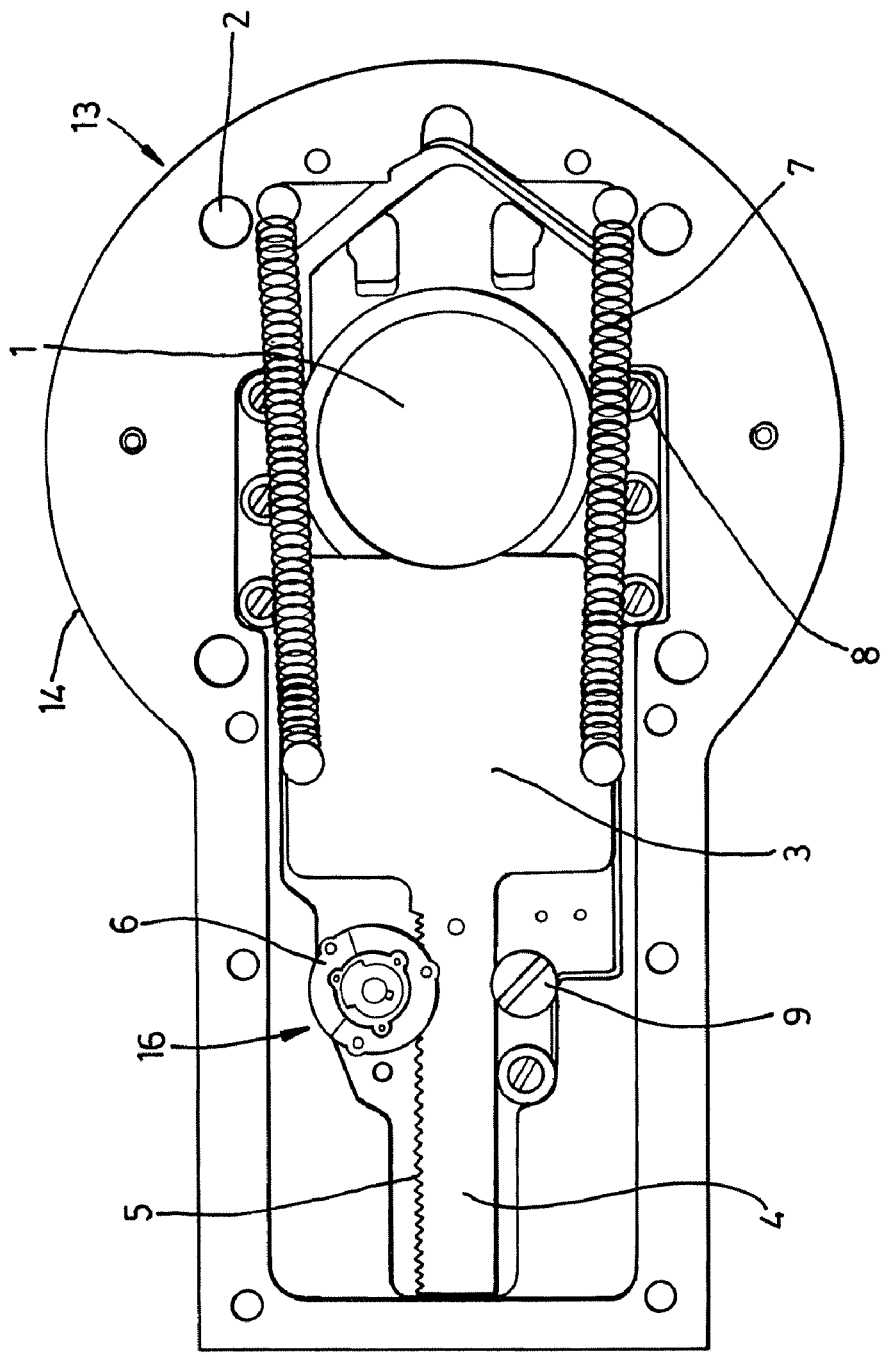
FIG. 1 is a side elevation of a fail safe shutter in accordance with the first aspect of the invention with cover plates and some components removed for clarity.
Figure 2:
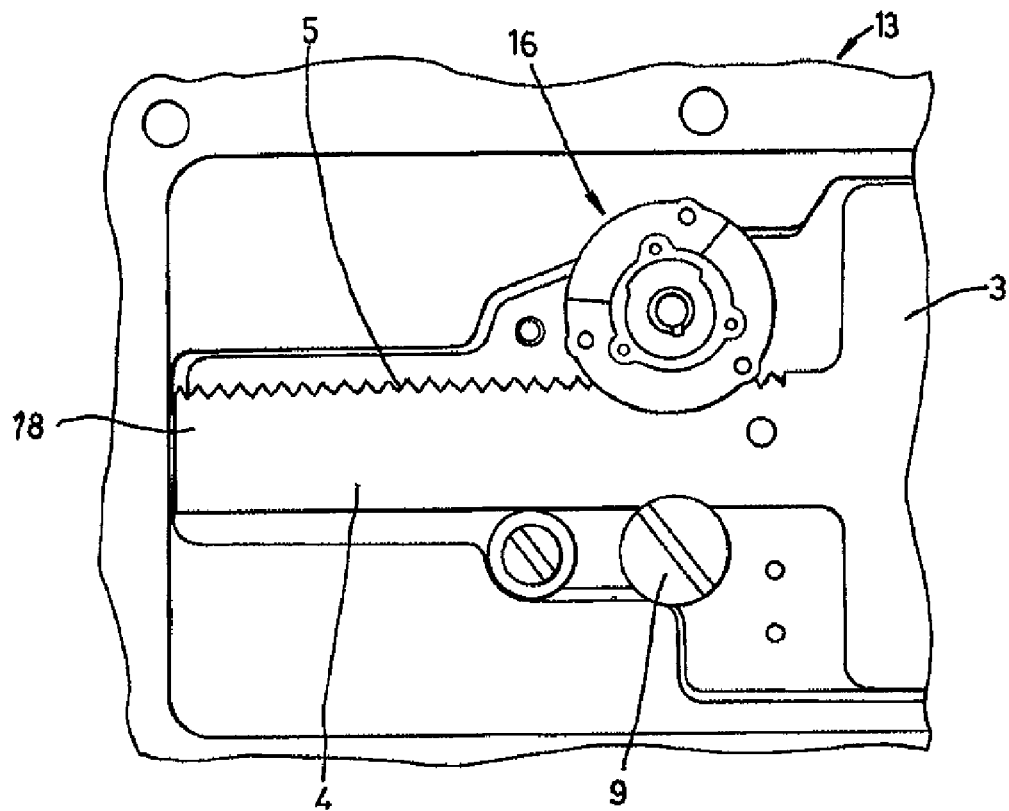
FIG. 2 is an enlarged view of the left hand portion of FIG. 1.

In the drawings, a fail-safe shutter 13 has a body member 14 provided with a large circular aperture 1 through which the monitoring instrument (not shown) sights. There are four bolt-holes 2 surrounding this, which are used to fix the shutter 13 to a flanged sight tube (not shown).

A linearly slidable gate 3 is rectangular with a tail 4 on the left-hand-side. The tail 4 has teeth 5 along an edge upper surface and forms a rack 18 of a rack-and-pinion mechanism with a pinion 6.

Two coil return springs 7 bias the gate 3 to its closed position, the gate 3 being loosely guided by six PTFE rollers 8.

A further PTFE roller 9 ensures the rack teeth 5 stay engaged with the pinion 6.

Figure 3:
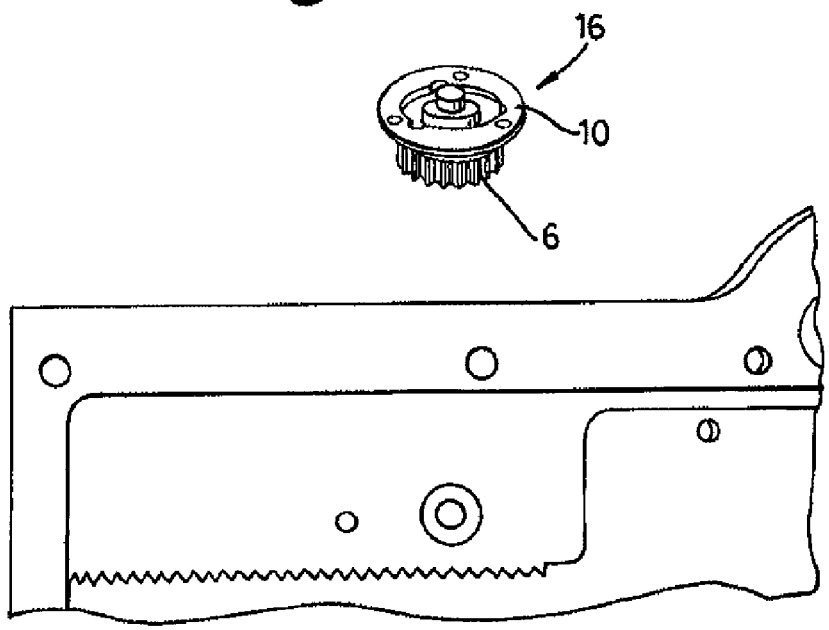
FIG. 3 details the magnetic clutch of FIGS. 1 and 2.
Figure 5:
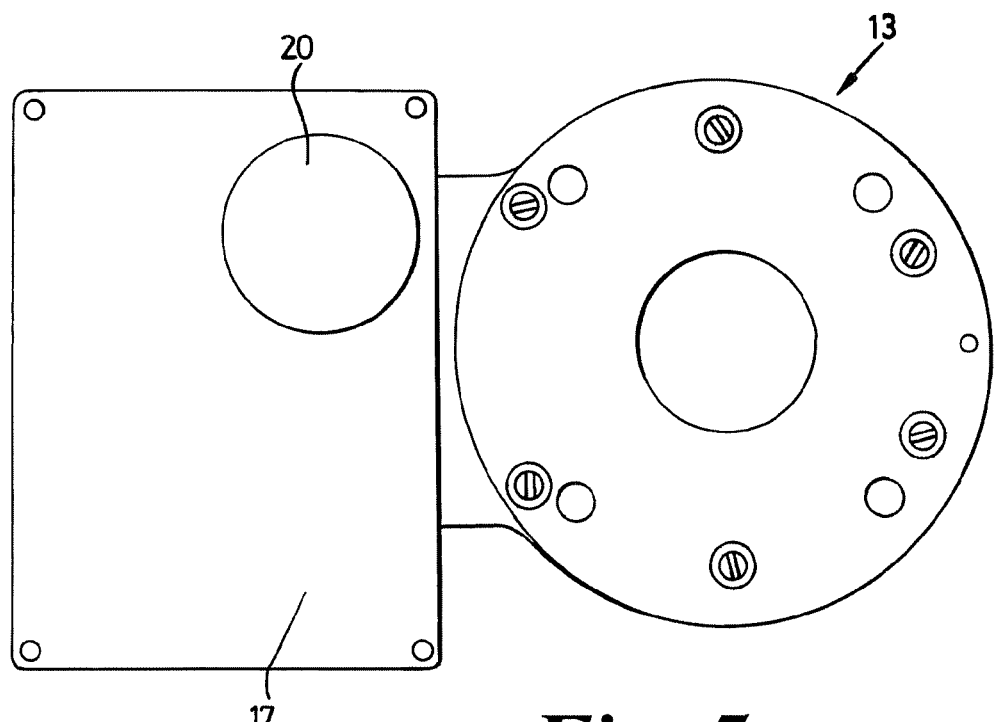
FIG. 5 corresponds to FIG. 1 but shows the cover plates fitted.
Figure 6:
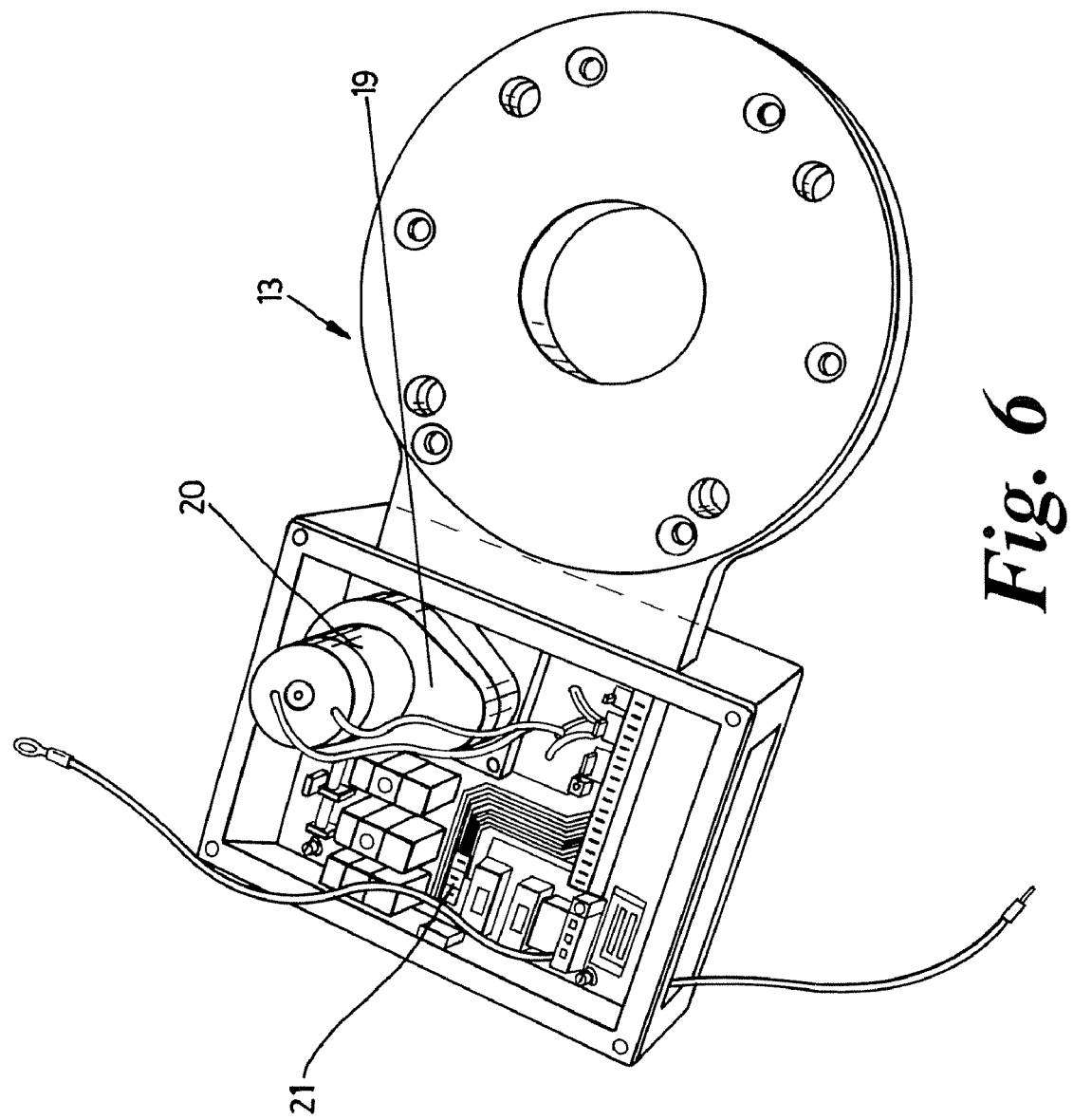
FIG. 6 corresponds to FIG. 1 but shows the removed components of FIG. 1 in place.
Figure 7:
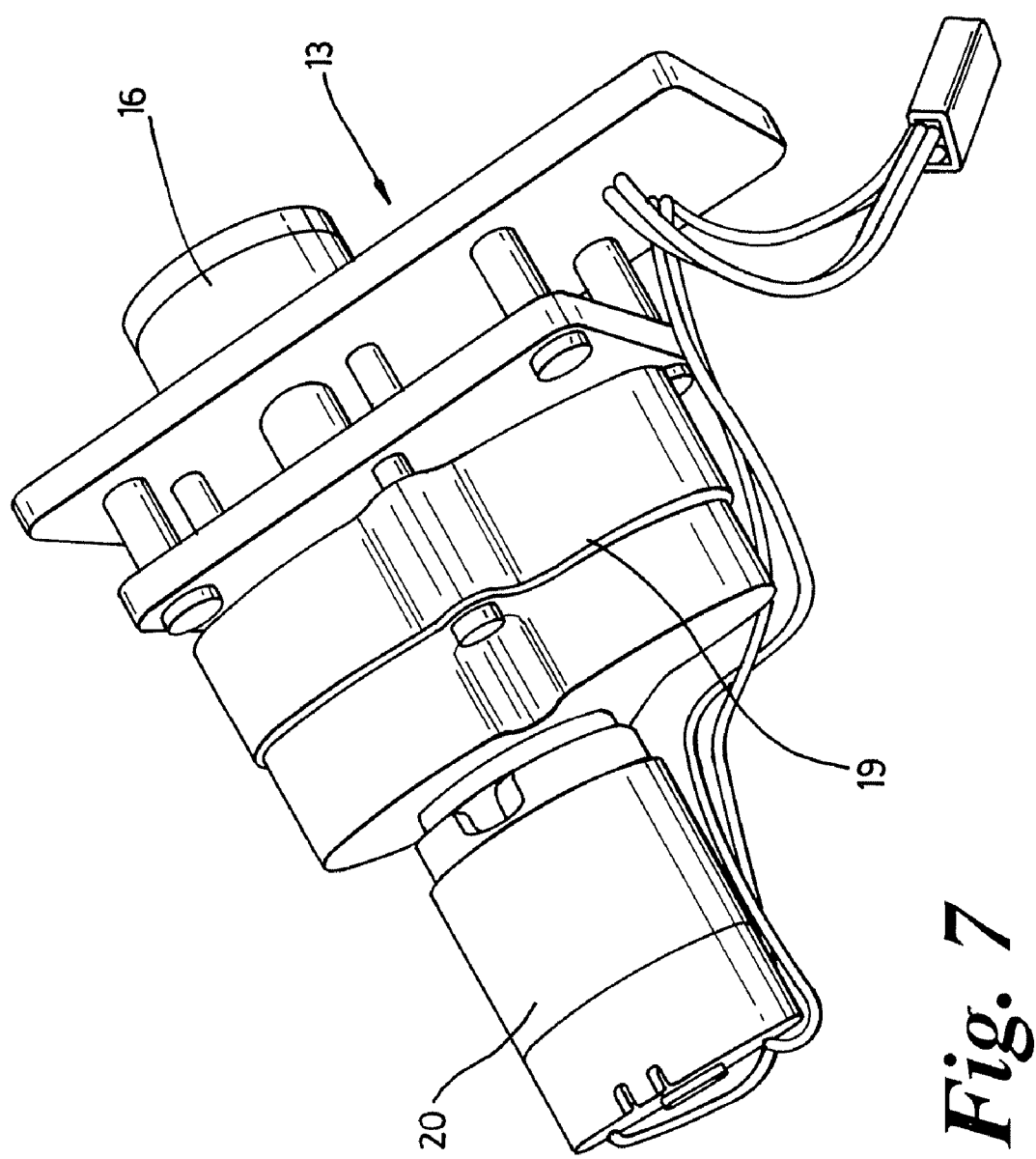
FIG. 7 is a side elevation, to a larger size of an assembly of components removed from the shutter of FIG. 6.

One face 10 of a magnetic clutch 16 is fastened to one side of the pinion 6, as indicated in FIG. 3. The other face is attached to a gearbox 19 connected to an electric motor 20 located in a housing 17, as shown in FIG. 5, which housing 17 also contains electronic control circuitry 21.

Figure 4:
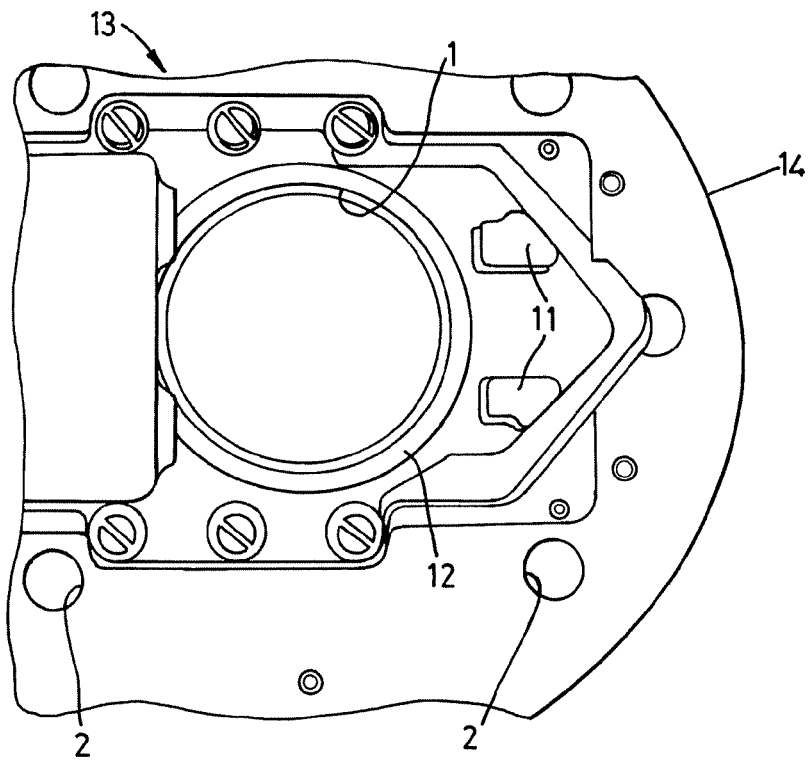
FIG. 4 is an enlarged view of the right hand portion of FIG. 1 with the springs removed.

When the magnetic clutch 16 is de-energised for any reason, the springs 7 pull the gate 3 closed against two end stops 11 as shown in FIG. 4. Mating faces of gate 3 and end stops are bevelled. This forces the gate 3 against a resilient circular gasket 12 e.g. of synthetic rubber, surrounding the hole 1.

To open the gate 3, power is supplied to both the magnetic clutch 16 and to the motor 20, whereby the motor 20 drives the gate 3 towards its open position via the gearbox 19, the magnetic clutch 16 and the pinion 6 and rack 18. When the gate 3 reaches its fully open position shown in FIG. 1 it trips a switch (not shown) which cuts electrical supply to the motor 20 only. With electrical supply to the clutch 16 maintained, the gate 3 is connected by the clutch 16 to the gearbox 20 and the rating of springs 7 and the mechanical advantage of the gearbox 20 are so arranged that the springs 7 cannot overcome the mechanical advantage and move the gate 3 to its closed position. Consequently, in this condition, the gate 3 remains open without power to the electric motor 20 and with no moving parts.

In the event of a failure of the electrical power supply, the clutch 16 is de-energised and the gate 3 is no longer connected to the gearbox 19, so that the bias of springs 7 is then able to pull the gate 3 to its closed position.

In the event of an industry-standard purge gas detection system detecting failure of presence of purge gas, a signal is fed to the control circuit 21, which in turn de-energises the clutch 16 to achieve the same gate-closing result.

The electronic control circuitry 21 is such that when electrical power is restored and/or and purge air flow is re-established at, or above, the minimum level, electrical power is re-connected to both the magnetic clutch 16 and the motor 20, whereupon the pinion 6 is then able to drive the gate 3, via its attached rack 18, back to the open position, against the spring bias.

What is claimed is:

1. A fail-safe shutter for use with a cross-stack monitor capable of monitoring the opacity of stack gases, comprising:
  (i) a body member having an aperture through which, in use, an associated optical monitoring instrument is adapted to sight the stack gases to be monitored;
  (ii) a resilient gasket surrounding said aperture;
  (iii) a linearly movable gate having opposed side edges, a leading end and a trailing end, with said side edges loosely engaged by guidance means;
  (iv) said gate, being linearly moveable between a retracted, open position in which said aperture is exposed, and a closed position in which said aperture is both closed-off, and sealed, by a portion of said gate engaging said resilient gasket to protect components of both said shutter and said optical monitoring instrument from said stack gases;
  (v) a tail, extending from said trailing end and also having opposed side edges, with one side of said edges being provided with a toothed rack;
  (vi) means to bias said gate toward said closed position;
  (vii) an electric motor, a gearbox and a magnetic clutch, with a pinion connected to said magnetic clutch and in mesh with said toothed rack;

(viii) a roller opposite said pinion engaging said other side edge of said tail to ensure engagement of said pinion with teeth of said rack;

(ix) said clutch, when energised, connecting said gate to said motor via said gearbox, and said motor, when energised, serving to drive said gate via said gearbox and said energised clutch to said open position, with attainment of said open position de-energising said motor only, and with said bias means being insufficient to overcome the mechanical advantage of said gearbox, whereby said gate is retained in said open position until such time as said clutch is de-energised either by a power failure, or by purge gas sensing means detecting absence of purge gas, or by other means; and (x) control circuitry to maintain and/or interrupt and/or return electrical supply to said clutch, and/or to said electric motor.

2. A shutter as claimed in claim 1, wherein by one or more coil return springs bias said gate to said closed position.

3. A shutter as claimed in claim 1, wherein said control circuitry incorporates means including a trip switch to cut power to said electric motor when said gate has attained said open position.

4. A shutter as claimed in claim 1, wherein said control circuitry is programmable to enable a routine daily test cycle to be effected.

5. A cross-stack monitor provided with a fail-safe shutter for use with a cross-stack monitor capable of monitoring the opacity of stack gases, comprising:

(i) a body member having an aperture through which, in use, an associated optical monitoring instrument is adapted to sight the stack gases to be monitored;

(ii) a resilient gasket surrounding said aperture;

(iii) a linearly movable gate having opposed side edges, a leading end and a trailing end, with said side edges loosely engaged by multiple guidance means;

(iv) said gate, being linearly movable between a retracted, open position in which said aperture is exposed, and a closed position in which said aperture is both closed-off, and sealed, by a portion of said gate engaging said resilient gasket to protect components of both said shutter and said optical monitoring instrument from said stack gases;

(v) a tail, extending from said trailing end and also having opposed side edges, with one side of said edges being provided with a toothed rack;

(vi) means to bias said gate towards said closed position;

(vii) an electric motor, a gearbox and a magnetic clutch, with a pinion connected to said magnetic clutch and in mesh with said toothed rack;

(viii) a roller opposite said pinion engaging said other side edge of said tail to ensure engagement of said pinion with teeth of said rack;

(ix) said clutch, when energised, connecting said gate to said motor via said gearbox, and said motor, when energised, serving to drive said gate via said gearbox and said energised clutch to said open position, with attainment of said open position de-energising said motor only, and with said bias means being insufficient to overcome the mechanical advantage of said gearbox, whereby said gate is retained in said open position until such time as said clutch is de-energised either by a power failure, or by purge gas sensing means detecting absence of purge gas, or by other means; and (x) control circuitry to maintain and/or interrupt and/or return electrical supply to said clutch, and/or to said electric motor.

6. A shutter as claimed in claim 1, wherein said guidance means for said opposed side edges of said gate takes the form of rollers.

* * * * *